United States Patent
Goering et al.

(10) Patent No.: US 11,832,550 B2
(45) Date of Patent: Dec. 5, 2023

(54) AGRICULTURAL NUTRIENT APPLICATION USING REAL-TIME SPECTROSCOPIC ANALYSIS OF LIVE CROP

(71) Applicant: Deere & Company, Moline, IL (US)

(72) Inventors: Kevin J. Goering, Cambridge, IA (US); Yancy E. Wright, Shawnee, KS (US)

(73) Assignee: Deere & Company, Moline, IL (US)

( * ) Notice: Subject to any disclaimer, the term of this patent is extended or adjusted under 35 U.S.C. 154(b) by 341 days.

(21) Appl. No.: 17/087,957

(22) Filed: Nov. 3, 2020

(65) Prior Publication Data

US 2022/0132729 A1  May 5, 2022

(51) Int. Cl.
*A01C 21/00* (2006.01)
*G01N 21/3554* (2014.01)
(Continued)

(52) U.S. Cl.
CPC .......... *A01C 21/007* (2013.01); *A01C 21/005* (2013.01); *G01N 21/3554* (2013.01); *G01N 21/3563* (2013.01); *G01N 21/55* (2013.01)

(58) Field of Classification Search
CPC ........... G01N 33/0098; G01N 21/3563; G01N 21/2554; G01N 21/55; G01N 21/35;
(Continued)

(56) References Cited

U.S. PATENT DOCUMENTS 4,650,336 A * 3/1987 Moll .................... G01N 21/64
356/417
5,793,035 A 8/1998 Beck et al.
(Continued)

FOREIGN PATENT DOCUMENTS

DE  102012107319 A1  5/2014
EP  2453222 A1 *  5/2012
(Continued)

OTHER PUBLICATIONS

"CROPXPLORER Crop sensor for optimized N-Balances", Isaria, Agxtend, retrieved on Apr. 14, 2021, retrieved at https://agxtend.com/products/cropxplorer, 12 pages.
(Continued)

*Primary Examiner* — Hoa Q Pham
(74) *Attorney, Agent, or Firm* — Christopher R. Christenson; Kelly, Holt & Christenson, PLLC

(57) ABSTRACT

An agricultural nutrient applicator includes a container and a nutrient distribution assembly operably coupled to the container to deliver a nutrient from the container. A spectroscopic reflectance crop sense system is provided that includes an optical window. A presentation assembly is mounted to the agricultural nutrient applicator and is configured to position live plants in a field proximate the optical window of the spectroscopic reflectance crop sense system as the agricultural nutrient applicator moves. A controller is coupled to the spectroscopic reflectance crop sense system and the nutrient distribution assembly. The controller is configured to obtain, from the spectroscopic reflectance crop sense system, information indicative of a measured nutrient level in the live plants and determine a remedial nutrient amount based on the measured nutrient level and a target nutrient level. The controller controls the nutrient distribution assembly based on the remedial amount.

21 Claims, 13 Drawing Sheets

(51) Int. Cl.
*G01N 21/3563* (2014.01)
*G01N 21/55* (2014.01)

(58) Field of Classification Search
CPC ... G01N 2021/8466; G01N 2021/1797; G01N 2021/3155; G01N 2021/6419; A01C 21/007; A01C 21/005; A01B 79/005; A01M 7/0089
USPC ............... 356/402, 416, 413, 301–326, 445; 250/341.8, 341.1, 358.1, 339.01, 339.05, 250/339.11; 47/48.5
See application file for complete search history.

(56) References Cited

U.S. PATENT DOCUMENTS

| | | | |
|---|---|---|---|
| 5,981,958 A * | 11/1999 | Li | G01N 21/6408 250/459.1 |
| 6,052,187 A * | 4/2000 | Krishnan | A01C 21/007 356/369 |
| 6,178,253 B1 * | 1/2001 | Hendrickson | G06T 7/40 382/110 |
| 7,265,831 B2 | 9/2007 | Kormann et al. | |
| 7,372,034 B2 | 5/2008 | Kormann et al. | |
| 10,386,296 B1 * | 8/2019 | Wolf | G01N 21/35 |
| 11,109,523 B2 * | 9/2021 | Campisi-Pinto | G06F 17/40 |
| 2003/0019152 A1 | 1/2003 | Raun et al. | |
| 2004/0065834 A1 * | 4/2004 | Stone | G01J 3/427 250/341.8 |
| 2004/0231239 A1 * | 11/2004 | Raun | A01C 21/007 47/58.1 SC |
| 2005/0122513 A1 * | 6/2005 | Masten | G01N 21/31 356/328 |
| 2010/0111369 A1 * | 5/2010 | Lussier | G01N 21/6486 356/417 |
| 2020/0025741 A1 * | 1/2020 | Rosen | G01N 21/27 |

FOREIGN PATENT DOCUMENTS

GB WO 2008/135867 A2 * 11/2008
WO WO 2014/023810 * 2/2014

OTHER PUBLICATIONS

Extended European Search Report and Written Opinion issued in European Patent Application No. 21202279.2, dated May 13, 2022, in 10 pages.

* cited by examiner

AGRICULTURAL NUTRIENT APPLICATION USING REAL-TIME SPECTROSCOPIC ANALYSIS OF LIVE CROP

FIELD OF THE DESCRIPTION

The present description relates to agricultural nutrient applicators. More specifically, the present description relates to providing agricultural nutrient applicators that control nutrient application based on nutrient analysis of live crops.

BACKGROUND

Effective selection, application and timing of nutrients for growing crops is essential to modern agriculture. As technology has improved the ability to deliver precise levels of nutrients to individual rows of plants, yields have improved. With the help of positioning systems (such as GPS), farmers can map nutrient content of their soils precisely, and can then use GPS coupled with on-tractor nutrient maps to enable delivery of various amounts of nutrients, such as fertilizer, to various parts of their fields, as needed, rather than applying a set amount over an entire field.

The discussion above is merely provided for general background information and is not intended to be used as an aid in determining the scope of the claimed subject matter.

SUMMARY

An agricultural nutrient applicator includes a container and a nutrient distribution assembly operably coupled to the container to deliver a nutrient from the container. A spectroscopic reflectance crop sense system is provided that includes an optical window. A presentation assembly is mounted to the agricultural nutrient applicator and is configured to position live plants in a field proximate the optical window of the spectroscopic reflectance crop sense system as the agricultural nutrient applicator moves. A controller is coupled to the spectroscopic reflectance crop sense system and the nutrient distribution assembly. The controller is configured to obtain, from the spectroscopic reflectance crop sense system, information indicative of a measured nutrient level in the live plants and determine a remedial nutrient amount based on the measured nutrient level and a target nutrient level. The controller controls the nutrient distribution assembly based on the remedial amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
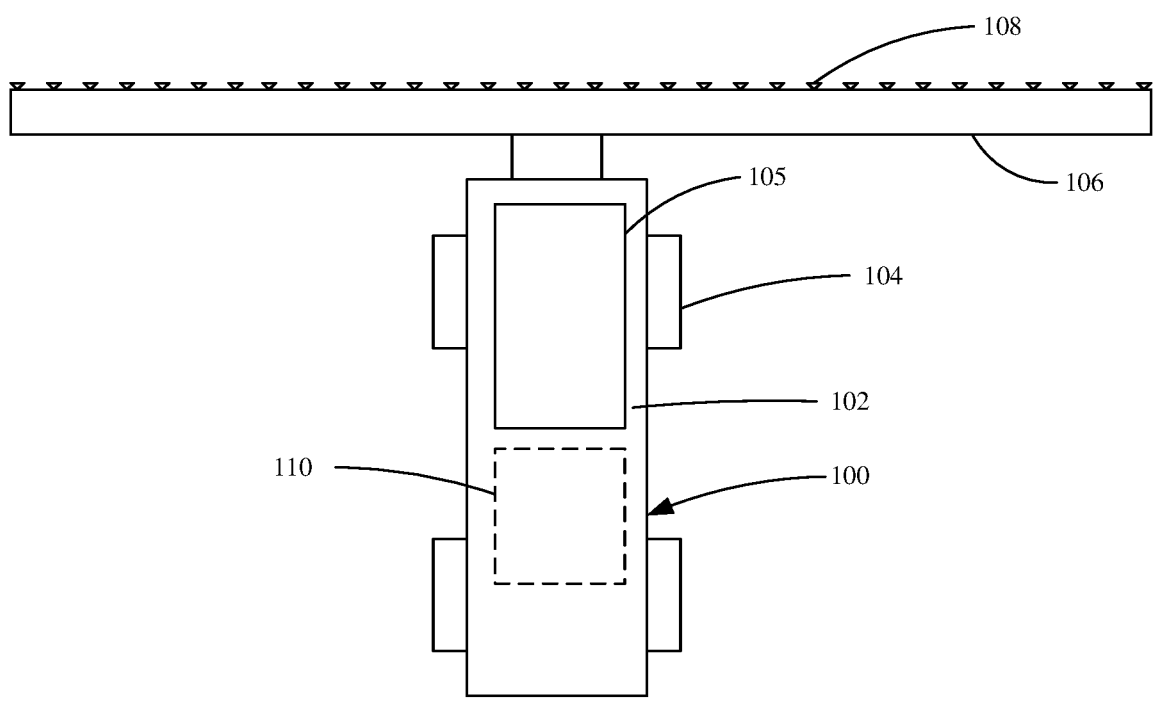
FIG. 1 is a diagrammatic top plan view of an agricultural nutrient applicator in accordance with one embodiment.

As set forth above, effective selection, application, and timing of nutrient delivery to growing crops is very important for effective agriculture. Embodiments described herein generally employ a device/technology in a new way to provide insight into growing (i.e. a live plant with roots in the ground) crops. This information allows more precise delivery of nutrients to the growing crops based on what the actual crops require. An agricultural nutrient delivery system and method of delivering nutrients to the growing crops are described below.

Spectroscopic analysis of plant matter has recently provided a wealth of information regarding harvested plants as well as in laboratory setting. For example, Near-infrared-reflectance (NIR) technology generates near-infrared illumination toward the harvested crop and analyzes the reflected return signal. Near-infrared, as used herein, means illumination having a wavelength beginning at 800 nanometers to 2,500 nanometers. The technology is able to produce results virtually instantly and is used in laboratory settings as well as harvesting operations. During harvesting, NIR is used to determine moisture content, dry matter, protein, starch, fiber, neutral detergent fiber, acid detergent fiber, and sugar of the harvested crop. This information can be used by the farmer to plan fertilization for the next season. One commercially available product that employs this technology is sold under the trade designation HarvestLab 3000, available from Deere & Company of Moline, Illinois. The HarvestLab 3000 device is used in both laboratory settings as well as on a harvester in order to obtain data in substantially real-time, such that it can be correlated with harvester location for future planning.

It is also believed that similar techniques can be used to with mid-infrared reflectance technology (MIR), which employs illumination having a wavelength longer than 2500 nanometers, but less than about 8000 nanometers. Further, embodiments described below include using combinations of NIR and MIR. While much of the disclosure is directed to NIR, this is for purposes of explanation and is equally applicable to MIR.

In accordance with embodiments described below, spectroscopic technology, such as NIR technology, is applied to growing crops in order to assess crop nutrient levels. However, using spectroscopic techniques, such as NIR, with growing crops involves significant challenges. First, the spectroscopic sensor can be adversely affected by ambient light (e.g. sunlight). While this is easy to control in a laboratory setting or in an agricultural machine where the crop has been severed from the ground, it is more difficult when the crop remains anchored to the ground. Second, spectroscopic technology requires that the material being sensed is provided prominently to the optical spectroscopic sensor. Again, this is trivial in a laboratory setting or a setting where the crop has been severed/removed from the ground. A third difficulty is that the process of presenting the growing crop to the spectroscopic sensor should not damage the crop. Embodiments set forth below generally overcome some or all of these challenges to allow spectroscopic technology (such as NIR and/or MIR) to be applied to growing crops thereby allowing the wealth of information provided by such technology to be used to inform the growing process (e.g. delivery of nutrients).

FIG. 1 is a diagrammatic top plan view of an agricultural nutrient applicator in accordance with one embodiment. While the example illustrated in FIG. 1 shows a self-powered agricultural nutrient applicator, those skilled in the art will appreciate that embodiments can be practiced with respect to any suitable agricultural machine whether it be self-propelled, or towed. In some embodiments, the agricultural machine is an agricultural nutrient applicator. However, embodiments can also be practiced with an agricultural machine that scouts the crops to determine nutrient requirements and correlates such nutrient requirements with positions. Further, embodiments described herein are equally applicable to nutrient applicators that apply dry nutrients, liquid nutrients, and/or gas nutrients. Further still, embodiments are equally applicable to nutrient applicators that apply side dress applications, and top dress applications, for example. As used herein, an agricultural nutrient applicator is intended to encompass sprayers, spreaders, side dress rigs, and high capacity nutrient applicators used in agriculture.

Agricultural nutrient applicator 100 includes a chassis 102 supported by wheels or tracks 104 to travel over a field of growing crops. Nutrient applicator 100 includes a nutrient container or tank 105 that is coupled to a nutrient applicator assembly 106 to distribute nutrients to the crop in the field. The nutrients may be in the form of dry nutrients, liquid nutrients, gas nutrients, or combinations thereof. As shown in FIG. 1, applicator assembly 106 includes a boom with a number of nozzles 108 mounted thereon and arranged to distribute nutrients. In accordance with one embodiment, nutrient applicator 100 includes or is coupled to spectroscopic crop sense module 110, which is configured to position live plants (i.e., growing crops) into contact with an optical window that allows infrared illumination to pass therethrough, such that the reflection of such infrared illumination can be received by a sensor of the spectroscopic crop sense module 110 to provide crop metrics relative to at least one of moisture content, nitrogen, potassium, and protein as well as provide metrics for other items that may limit nitrogen, potassium and/or protein uptake or protein accumulation. Examples of such other items include phosphorous and sulfur as well as essential plant micronutrients. Spectroscopic crop sense module 110 is mounted relative to the agricultural nutrient applicator 100 such that the optical spectroscopic technology (such as NIR and/or MIR) and is not affected by sunlight, nor does it damage the growing plants. As can be appreciated, given that the crops may be anywhere in their lifecycle from seedlings to mature plants, spectroscopic crop sense module 110 may include different techniques/mechanisms for carefully presenting the plants to the optical sensor in a way that is both technically effective, is not unduly affected by ambient sunlight, and does not damage the plants.

Figure 2:
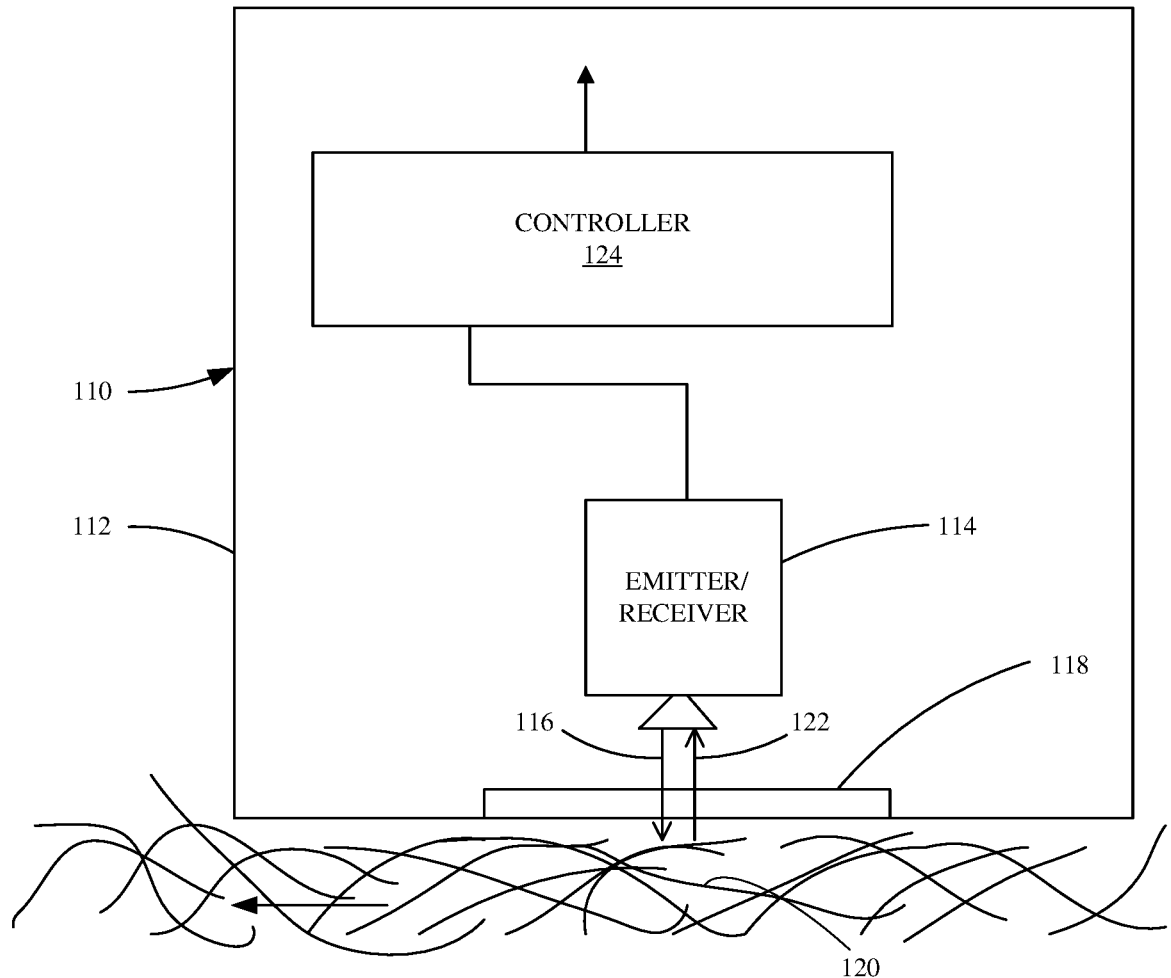
FIG. 2 is a diagrammatic view of a spectroscopic crop sense module in accordance with one embodiment.

FIG. 2 is a diagrammatic view of a spectroscopic crop sense module in accordance with one embodiment. Spectroscopic crop sense module 110 generally includes a housing 112 containing an infrared reflectance (NIR and/or MIR) emitter/receiver module 114. Emitter/receiver module 114 is configured to transmit infrared illumination 116 through optical window 118 to reflect off growing plants 120. The reflected illumination 122 is received by emitter/receiver module 114 and provides a signal to controller 124 that is analyzed, in accordance with known techniques, to determine, among other things, nutrient levels of the growing plants. Examples include nitrogen, potassium, moisture, phosphorous, sulfur, calcium, and protein (which, while not technically a nutrient is an organic compound built from amino acids/nutrients). These measurements of substantially real-time nutrient levels in the growing crops can be compared to target nutrient levels for a nominal crop at the current lifecycle (e.g., seedling, intermediate crop, or mature crop) and the requisite level of individual nutrients can be determined to correct any deficiencies can be calculated and applied in real-time to the growing plants as the agricultural nutrient applicator passes thereover. Additionally, while the embodiment shown in FIG. 1 employs a single spectroscopic crop sense module 110, it is expressly contemplated that multiple such sensor modules could be used to provide additional levels of granularity, all the way down to individual rows of plants.

In accordance with embodiments described below, the farmer is presented with a plurality of detachable mechanical assemblies for presenting the growing crops to the optical sensor for different maturity levels of the crop.

Figure 3A:
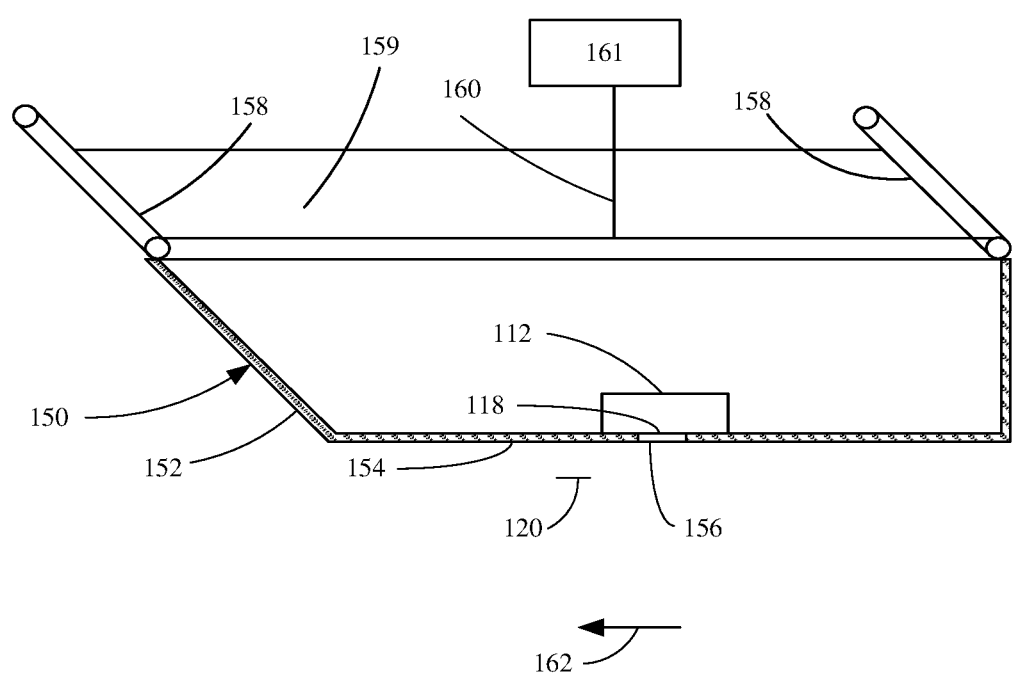
FIG. 3A is a diagrammatic cross-sectional view of a presentation assembly of a spectroscopic crop sense module for seedlings and particularly fragile small plants, in accordance with one embodiment.

FIG. 3A is a diagrammatical cross-sectional view of a presentation assembly 150 of spectroscopic crop sense module 110 for seedlings and particularly fragile small plants. Assembly 150 generally includes a tapered leading edge 152 and a bottom 154 having an aperture 156. Optical window 118 is disposed proximate, or even within, aperture 156. Housing 112 is disposed above aperture 156. Housing 112 is generally enclosed such that the only light that may enter assembly optical window 118 is via aperture 156.

Assembly 150, in some examples, is formed of a relatively low friction material, such as plastic and is hingedly coupled beneath chassis 102 of agricultural nutrient applicator 100 such that it may be raised and lowered by the operator of the applicator. As shown in FIG. 3, assembly 150 also includes a cable 160 coupled to automatic height control system 161 that controls the vertical movement of presentation assembly 150 relative to chassis 102. Automatic height control system 161 controls the height of presentation assembly 150 to obtain an accurate measurement of the live plants without damaging the live plants. Thus, as actuator 160 is lowered or the cable is lengthened, presentation assembly 150 descends until it contacts the ground beneath chassis 102. Additionally, cable 160 may include or be coupled to a spring, such as an extension spring, thereby allowing a selectable bias of presentation assembly 150 relative to the ground. As agricultural nutrient applicator 100 drives over the field, the plants 120 will pass window 118 in the direction indicated by arrow 162. Presentation assembly 150 includes one or more opaque curtains or bellows 159 that block ambient light. Since housing 112 prevents all light from entering into spectroscopic crop sense module 110 except for that passing through window 118, the system substantially isolates the sensor from sunlight and other sources of error. Further, the sensor is brought down into intimate optical contact with the growing plants such that an effective infrared reflectance signal can be obtained. Further still, by providing a selectable bias on the presentation assembly as it slides or passes over the crops, the growing crops will not be damaged.

Figure 3B:
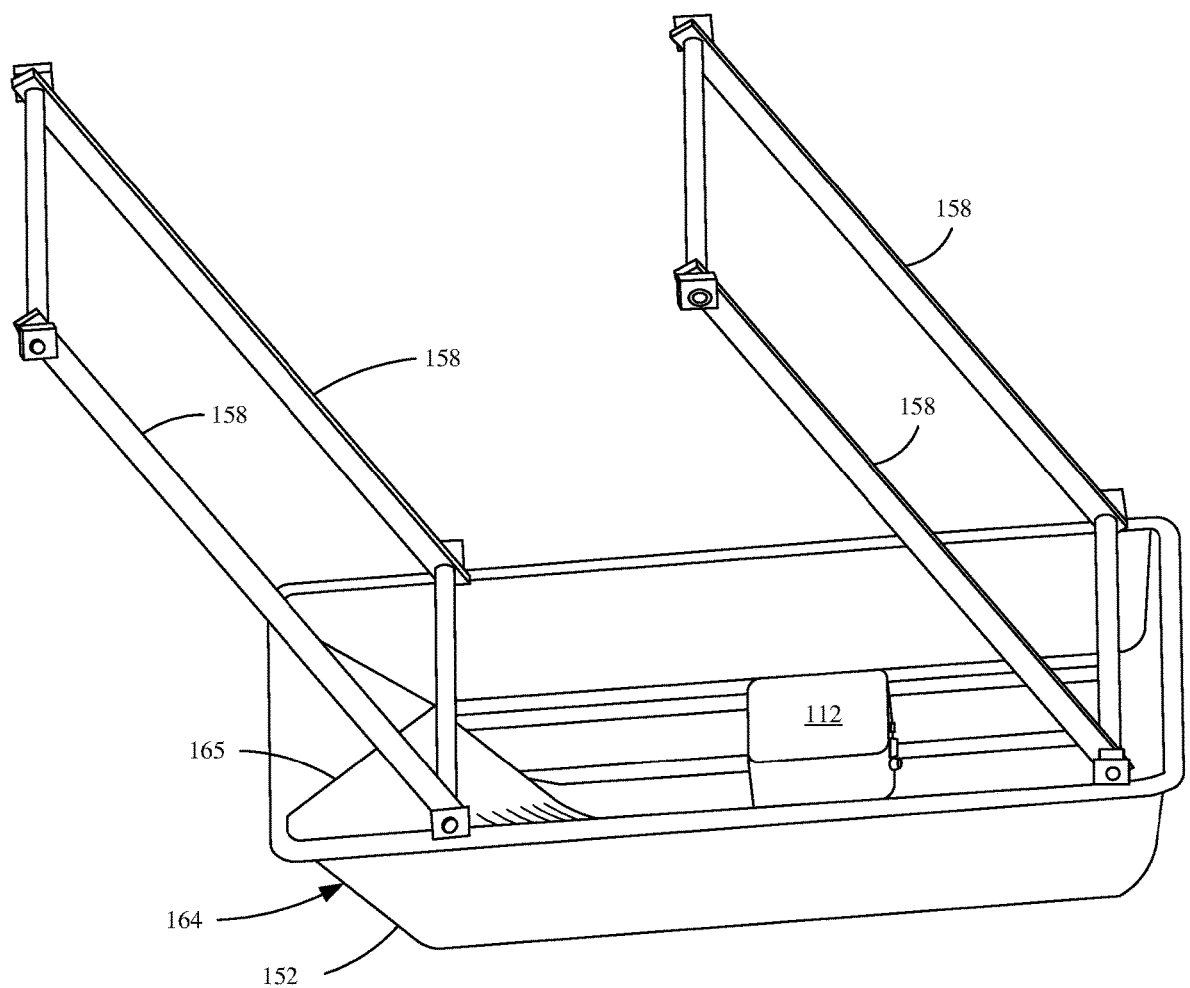
FIG. 3B is a diagrammatic perspective view of a presentation assembly of a spectroscopic crop sense module for seedlings and particularly fragile small plants, in accordance with one embodiment.

FIG. 3B is a diagrammatic perspective view of a presentation assembly 164 of a spectroscopic crop sense module for seedlings and particularly fragile small plants, in accordance with one embodiment. The embodiment illustrated in FIG. 3B is similar to the embodiment illustrated in FIG. 3A and like components are numbered similarly. Assembly 158 includes four links 158 that are configured to pivotally couple to the chassis 102 of the agricultural nutrient applicator to allow assembly 164 to be lowered or raised. Assembly 164 also includes surface contour 165 in leading edge 152 in order to present more plants to optical window 118 beneath housing 112.

The embodiments described with respect to FIGS. 3A and 3B are particularly useful for small grain cereal crops in early season. The designs can be embodied in a simple sled with a hole or aperture in the bottom for the sensor to look through and see the crop. Such designs may use the weight of the sled and the sensor to press down upon the crops in order to obtain a sufficient reading, or the sled may be selectably biased to provide additional or reduced force relative to gravity alone. The sled may be formed of any suitable material as long as the material is opaque. In one example, the sled is formed of an opaque plastic.

Figure 4:
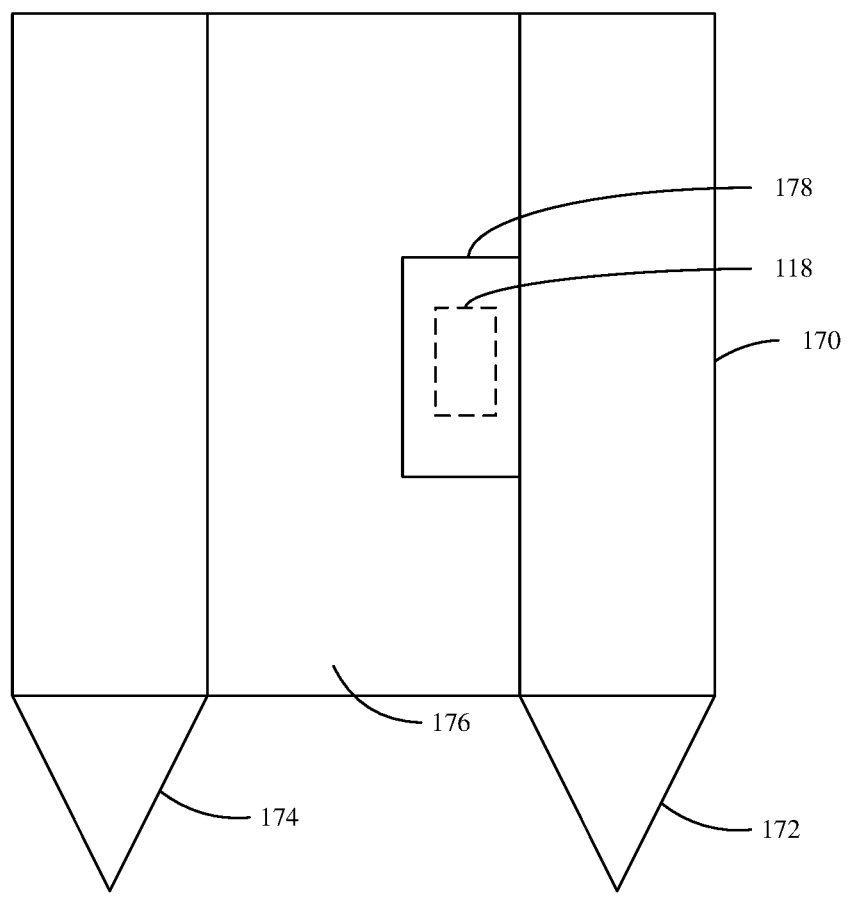
FIG. 4 is a diagrammatic view of a presentation assembly of a spectroscopic crop sense module in accordance with another embodiment.

FIG. 4 is a diagrammatic view of a presentation assembly 170 of spectroscopic crop sense module 110 in accordance with another embodiment. Presentation assembly 170 is designed for small grain cereal crops later in the season, such as prior to first node of stem visibility, Feekes growth stage 6. Assembly 170 includes two pontoons 172, 174 that divide the taller crop such that it passes within region 176. Additionally, presentation assembly 170 includes a location 178 for housing 112 of a spectroscopic sensor, such as an NIR and/or MIR sensor. Preferably, window 118 is positioned and arranged to view a lower portion of the crop. This lower portion of the crop is believed to be where nutrient deficiencies can first be detected because nutrient deficiencies for nutrients that are mobile in the plant, such as nitrogen, where remobilization moves the nutrients from older plant tissues to newer tissues/reproductive components. Like presentation assembly 150, presentation assembly 170 is also selectably deployable beneath chassis 102 of agricultural nutrient applicator 100. Additionally, as set forth above, embodiments described herein can include multiple such presentation assemblies and spectroscopic sensors to provide increased granularity information relative to the growing crops.

Figure 5A:
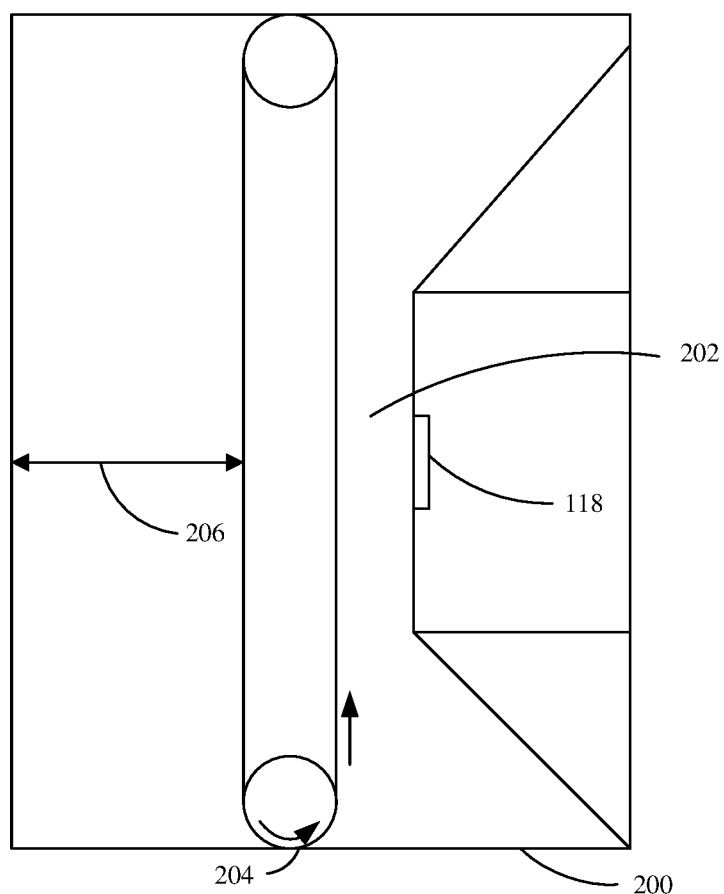
FIGS. 5A and 5B are top plan and perspective diagrammatic views, respectively, of a presentation assembly of a spectroscopic crop sense module in accordance with another embodiment.
Figure 5B:
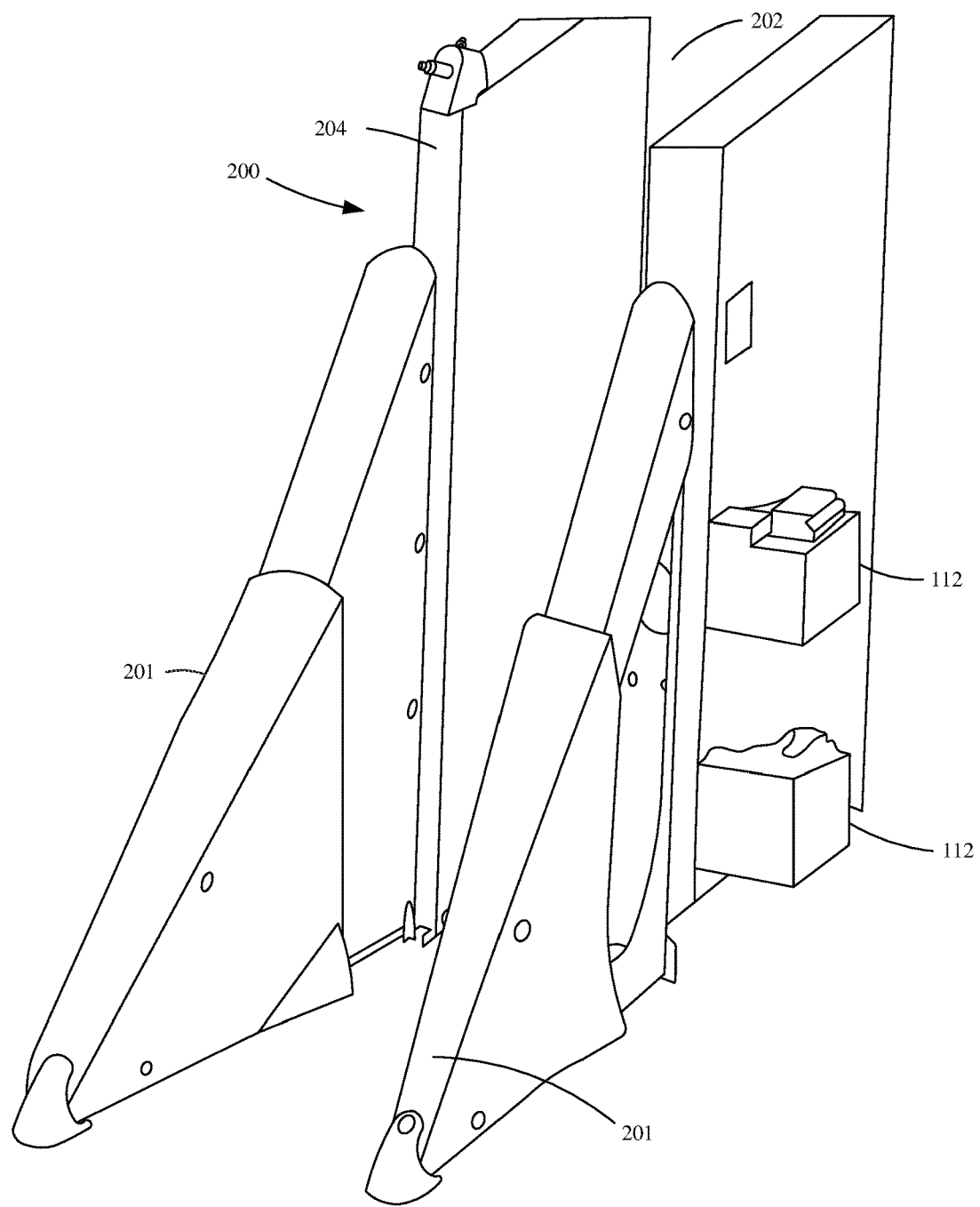

FIGS. 5A and 5B are top plan and perspective diagrammatic view, respectively, of a presentation assembly 200 of spectroscopic crop sense module 110 in accordance with another embodiment. Assembly 200 is designed for mature row crops. It may include one or more stalk lifters 201 to lift branches and generally has a relatively large chamber 202 to let the crop through, yet still control ambient light. On one side, is a conveyor 204 to directly move the crop through chamber 202. This conveyor is intended to run at a speed timed to ground speed to not damage the plants. On the other side is one or more apertures to allow windows 118 spectroscopic sensors (such as NIR and/or MIR sensors) within housings 112 to look through and scan the crop. Preferably, one side of assembly 200 includes a spring or other selectable bias mechanism, illustrated diagrammatically at reference numeral 206 to select how much bias is applied on the crop material to obtain a sufficient reading using the spectroscopic sensor, but not so much force that it damages the crop passing through chamber 202.

Figure 6:
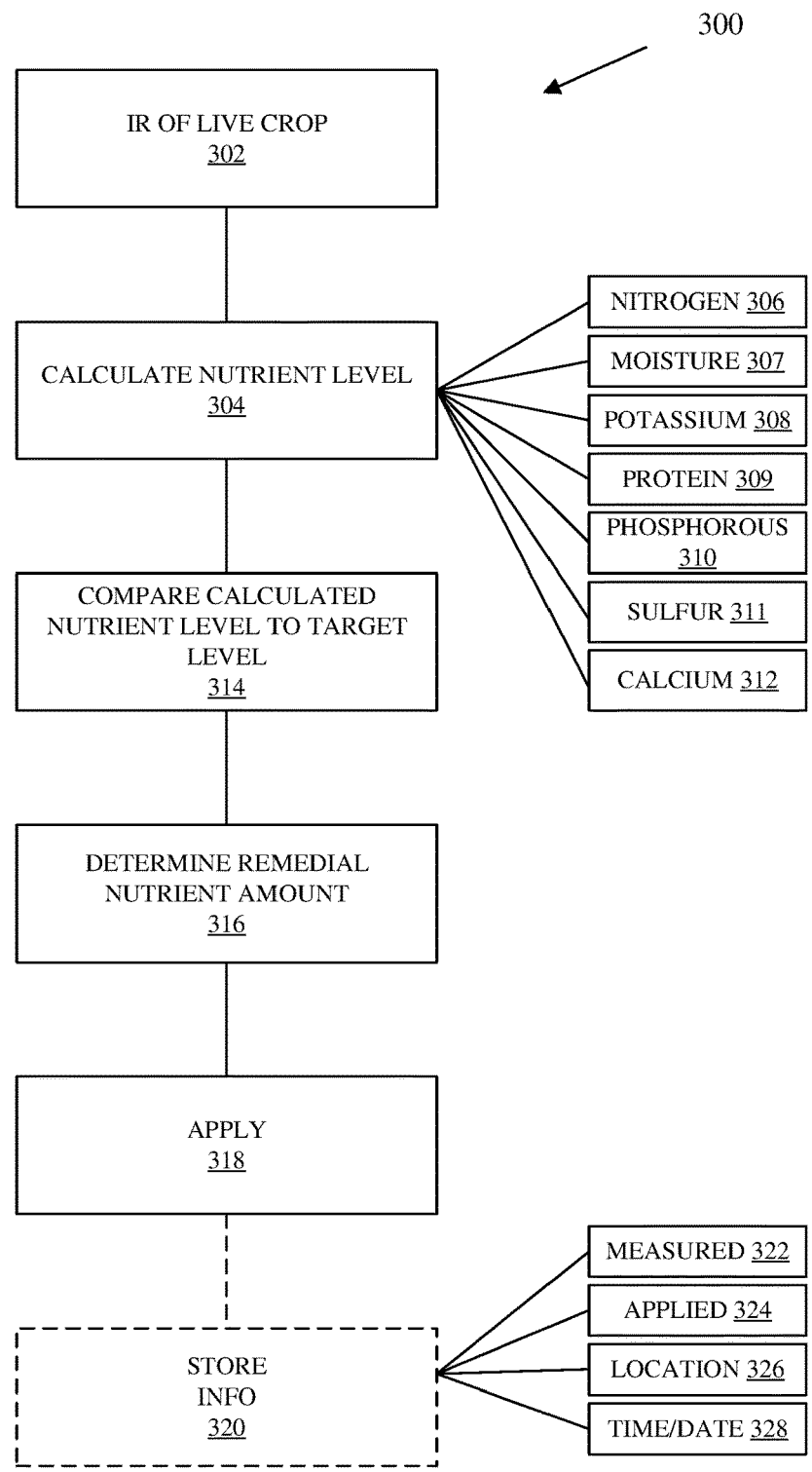
FIG. 6 is a flow diagram of a method of applying nutrients to an agricultural crop in accordance with one embodiment.

FIG. 6 is a flow diagram of a method of applying nutrients to an agricultural crop in accordance with one embodiment. Method 300 begins at block 302 where infrared reflectance technology is used to obtain a reflectance response from a live crop. This reflectance response is used, at block 304, to calculate one or more nutrient levels in the live crop. Examples of nutrients for such nutrient level calculation include nitrogen 306, moisture 307, potassium 306, protein 309, phosphorous 310, sulfur 311, and calcium 312. Next, at block 314, the measured nutrient level(s) is compared with a target level for the live crop. This target may be adjusted based on the position in the lifecycle of the live crop (e.g., seedling, intermediate crop, mature crop) as well as other suitable factors. For example, additional sensors and technologies can be used to obtain additional information relative to the live crops that can be used in combination with the spectroscopic-derived nutrient information. Examples of additional sensors include visible spectrum cameras (located on the applicator, provided by satellite imaging, and/or mounted to a manned or unmanned aerial system) that may assess the presence and/or color of the live crop, biomass sensors, and others. Regardless, at block 316, a remedial nutrient amount for the live crop is determined based on the comparison of the measured nutrient level and the target level. Next, at block 318, the remedial nutrient amount calculated at block 316 is actually applied to the live crop.

As shown at phantom block 320, method 300 may also include storing information as such information may be useful for subsequent operations. Examples of such stored information can include the measured nutrient levels 322, applied nutrients 324, the position of the nutrient applicator 326 (via GPS signals, or other suitable position information), and/or the time of application 328. The information may be stored locally in the agricultural nutrient applicator, or transmitted wirelessly to a remote nutritional information data store.

Figure 7:
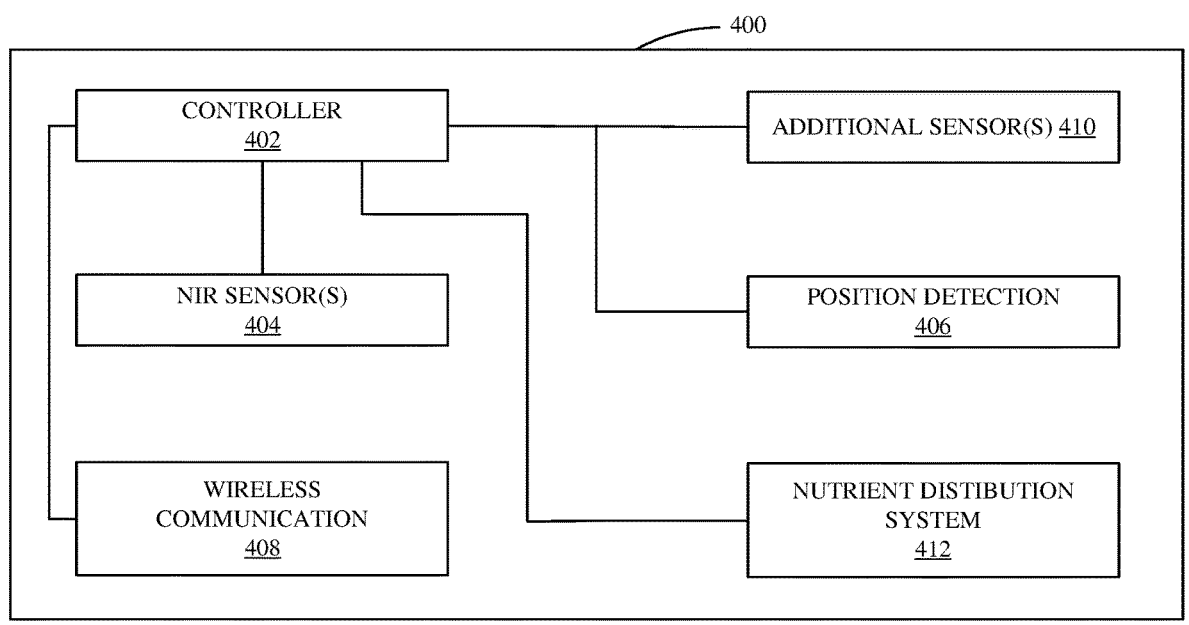
FIG. 7 is a diagrammatic view of a control system of an agricultural nutrient applicator in accordance with one embodiment.

FIG. 7 is a diagrammatic view of a control system of an agricultural nutrient applicator in accordance with one embodiment. Control system 400 includes applicator controller 402 that, in one example, may be a microprocessor. Controller 402 includes or is coupled to suitable memory in order to execute a sequence of instructions to provide measurement and/or control functions related to applicator function. Controller 402 is coupled to one or more spectroscopic sensors 404 each of which may include its own controller and emitter/receiver (as shown in FIG. 2). As one example of the utilization of multiple spectroscopic sensors 404, an NIR and/or MIR sensor 404 could be installed on each section of a multi-section boom of an agricultural sprayer. Thus, if the sprayer has five sections, five such sensors 404 would be employed. As another example of the utilization of multiple such spectroscopic sensors, on a high capacity nutrient applicator having an air boom, there are two sections, and thus two spectroscopic sensors 404 would be used. Controller 402 receives, from spectroscopic sensor(s) 404 information indicative of nutrient levels of growing crops/live plants that pass by the optical window(s) of the sensor(s) 404 as the applicator moves across the field.

Controller 402 is also coupled to position detection system 406, which provides an indication of the geographic position of the agricultural nutrient applicator. In one example, position detection module 406 uses known GPS technology to provide a latitude and longitude position of the applicator. However, embodiments may include any suitable position detection system that provides useful position information relative to the applicator. Suitable examples of position sensors include any suitable global navigation satellite system (GNSS) that provides geo-location and time information to a suitable receiver anywhere on earth. In one example, the GNSS device is a GPS receiver. However, other suitable GNSS devices, such as the Russian (GLO-NASS) system can be used. Further, differential GPS technologies can also be used with respect to module 154. Finally, non-GNSS position-based signaling systems, such as LORAN or cellphone/WIFI triangulation, can be used for position detection module 406. Accordingly, by virtue of the connection of controller 402 to both sensor(s) 404 and position detection system 406, actual measured nutrient levels in live crops can be correlated with the position of the live crops in order to apply requisite nutrients, or take other suitable remedial action. Additionally, as set forth above, the nutrient information may be correlated with the position information being stored locally by controller 402, or in a remote data system using wireless communication.

As shown in FIG. 7, controller 402 is coupled to wireless communication module 408, which allows controller 402 to communicate wirelessly, preferably bidirectionally, with one or more remote devices. Examples of suitable wireless communication include, without limitation, Bluetooth (such as Bluetooth Specification 2.1 rated at Power Class 2); a Wi-Fi specification (such as IEEE 802.11.a/b/g/n); a known RFID specification; cellular communication techniques (such as GPRS/GSM/CDMA); WiMAX (IEEE 802.16), and/or satellite communication. Using wireless communication module 408, controller 402 can communicate measured nutrient information, applied nutrient information, position data, and/or time data to a suitable remote device, such as a cloud-based nutrient information store 111 (shown in FIG. 9)

Additionally, controller 402 may be coupled to one or more additional sensors 410 that may provide additional information relative to the growing crops. Such additional sensors can include visible spectrum cameras that may provide an indication of crop presence, height, and/or color, biomass sensors, soil sensors, oxygen sensors, carbon dioxide sensors, etc. Information from one or more of these additional sensors 410 may be provided to controller 402 in order to adjust the function of agricultural nutrient applicator 100. For example, a visible spectrum camera may be used to determine an estimate of crop biomass, which is then used to provide an indication of crop lifecycle, which informs target nutrient levels.

As shown in FIG. 7, controller 402 is also coupled to nutrient distribution system 412 which controls individual nozzles of the nutrient applicator, or other suitable nutrient flow/delivery mechanisms. In this way, the flow or delivery rate of nutrients to the crop can be based on the actual measured nutrients in the crop as the agricultural nutrient applicator passes thereover. This provides the plants with the specific nutrients that they require based on an actual measurement of their need in the field.

Figure 8:
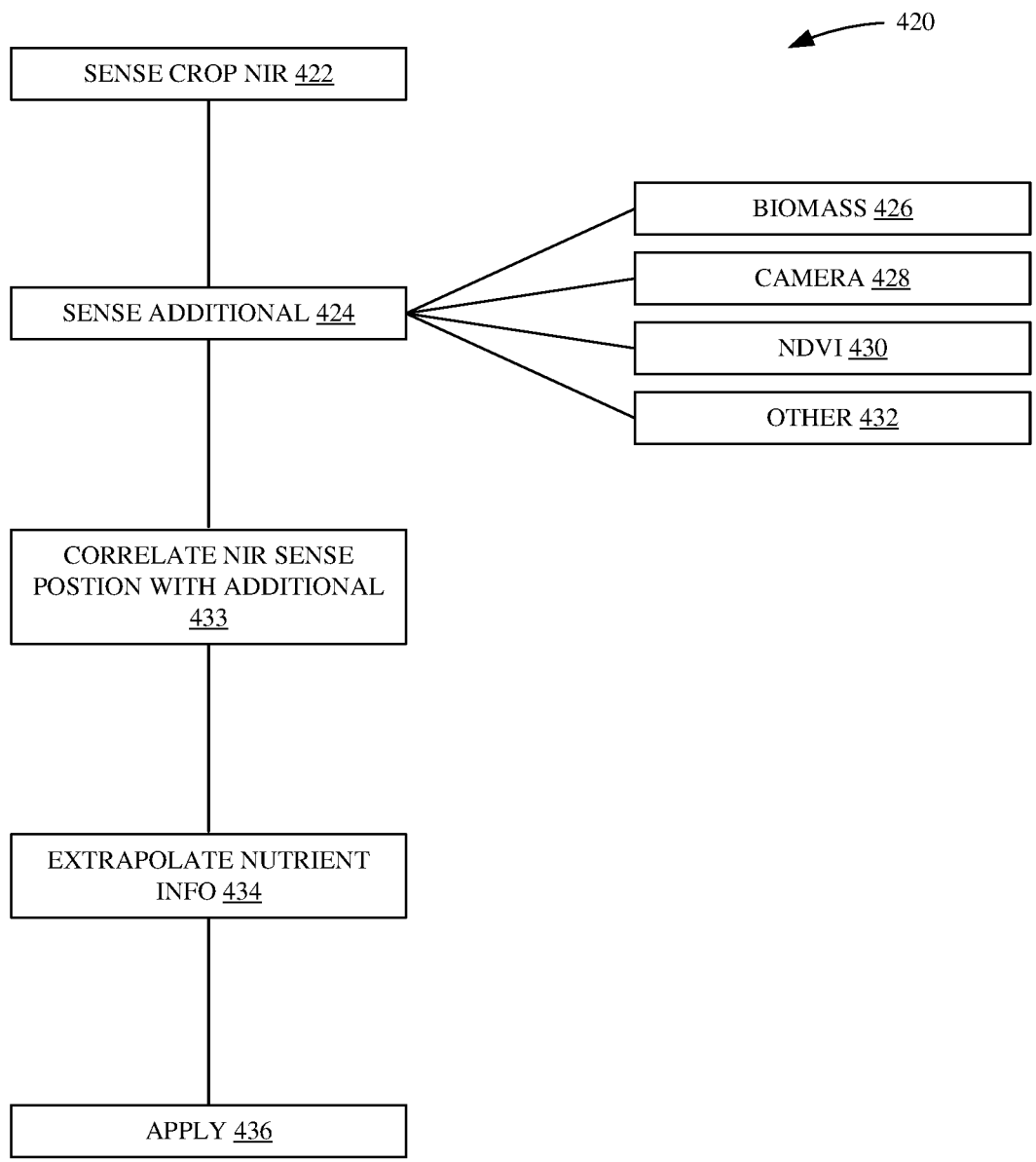
FIG. 8 is a flow diagram of a method of applying agricultural nutrients in accordance with one embodiment.

FIG. 8 is a flow diagram of a method of applying agricultural nutrients in accordance with one embodiment. Method 420 begins at block 420 where one or more spectroscopic sensors are used to sense live crops, as described above. For example, a single spectroscopic sensor located under an agricultural nutrient applicator may sense live plants passing under the sensor. Next, at block 424, at least one additional sensor or detector is used to obtain additional information regarding the crop or field. In one example, visible light and/or multi-spectra cameras 428 are used to view the entire width of the nutrient applicator and determine a relative health of the crop. The spectroscopic sensor signal is then used to measure the center row or section. Next, at block 433, the spectroscopic sensor signal position is correlated to the additional sensor information. In the example where the additional information is obtained from visible light/multi-spectra cameras, the output of the cameras across the width of the nutrient applicator is compared to the output at the center where the spectroscopic sensor is. If the cameras determine that the crop has a similar health (e.g. for example as indicated by color) across the width, then the value measured by the spectroscopic sensor is applied to the full width. This is an example of extrapolating the spectroscopic sensor response based on the additional sensor or detector, as indicated at block 434. If, however, the cameras detect areas that are more or less green than the location of the spectroscopic sensor, the value(s) obtained by the spectroscopic sensor can be adjusted up or down based on the difference. The adjusted values are then provided to the applicator to provide the requisite nutrient(s) to the plants. Thus, a very precise application of nutrients can be made with relatively low-cost sensor components.

As shown in FIG. 8, other examples of additional sensors that can be used is a biomass sensor 426 and/or a normalized difference vegetation index (NDVI) sensor 430. When the spectroscopic sensor signal is coupled with a biomass sensor signal 426, the biomass sensor signal 426 can be used to determine the amount of crop (biomass) present and the spectroscopic sensor signal can quantify the nutrient levels in that crop. Taken together, these two inputs can be used to accurately predict the amount of nutrients required to maximize yield and protein in the crop.

Other types of sensors and information can also be used, as indicated at block 432. As an example of other information, an image obtained from an overhead drone or satellite can be used to divide the field into different zones of relative plant health. Then, as the nutrient applicator moves through the field with the spectroscopic sensor, it will quantify the nutrient levels in each zone and then apply the appropriate rate for each zone.

As can be appreciated, using additional sensor(s) can facilitate intelligent adjustments to the spectroscopic measurement-based nutrient delivery. In some examples, the requisite levels of nutrients are extrapolated based on images obtained across the width of the applicator and/or images from a manned or unmanned aerial system/satellite. However, embodiments can also use the additional sensor/information to determine that portions of the field under the applicator have little or no crop. In these circumstances, the applicator can prevent excess nutrients from being delivered as they would simply be wasted or applied at a level toxic to the plant. This is helpful in that nutrients would not need to be applied in areas where there are no crops, thus saving input costs and protecting the environment. It can also help by designating areas with little or no crop so that the output of the spectroscopic sensor in those areas can be disregarded.

Figure 9:
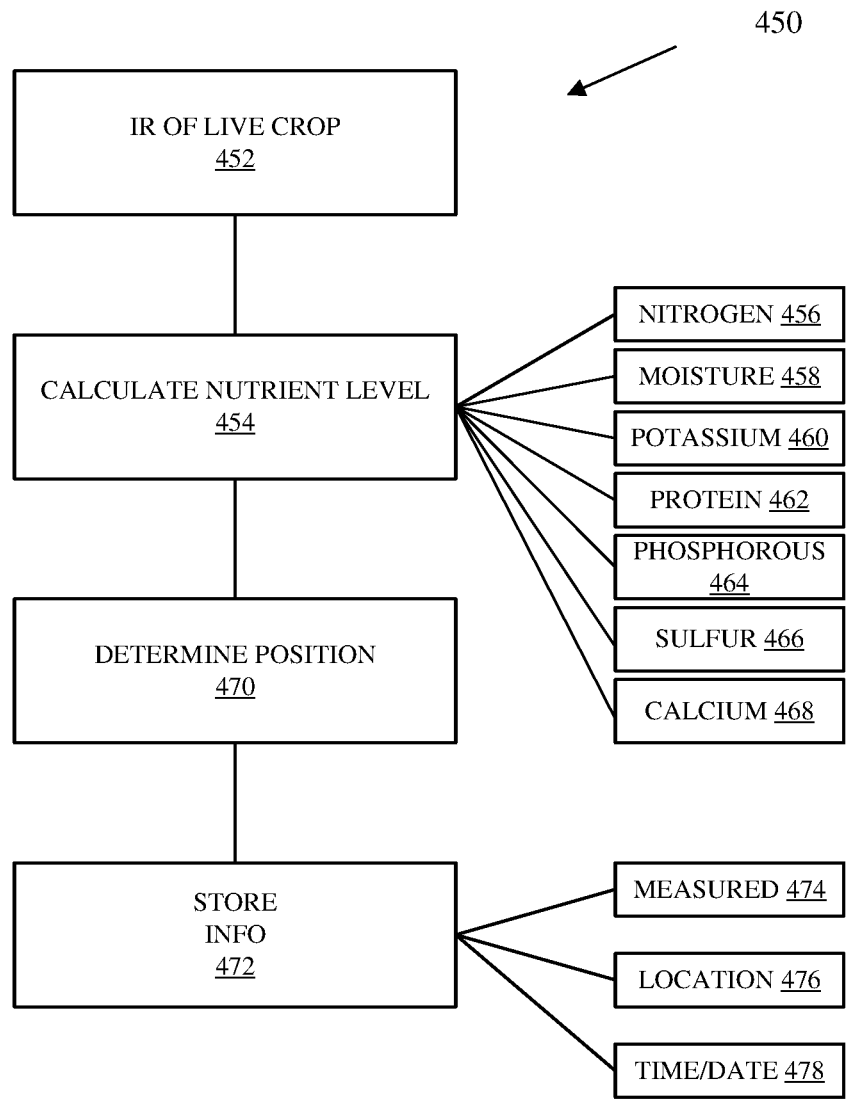
FIG. 9 is a flow diagram of a method of measuring a nutrient level in a live crop in accordance with one embodiment.

FIG. 9 is a flow diagram of a method of measuring a nutrient level in a live crop in accordance with one embodiment. Method 450 begins at block 452 where infrared illumination (either near-infrared, mid-infrared, or both) is directed at a live crop and a reflectance signal is obtained. While this may be accomplished using a presentation assembly located on or below a nutrient applicator, it may also be accomplished using a presentation assembly alone that is dragged or otherwise conveyed through the live crops. For example, the presentation assembly shown in FIG. 3A could simply be towed through the crop. In another example, the presentation assembly may form part of an autonomous vehicle that is commanded or otherwise programmed to traverse the crop to scout nutrient levels.

Next, at block 454, the reflectance signal is used to calculate one ore more nutrient levels in the live crop. In doing so, known calibrations or characterizations of infrared reflectance signals are used to determine the nutrient-related substance levels. Examples of nutrient-related substance levels include, without limitation, nitrogen 456, moisture 458, potassium 460, protein 462, phosphorous 464, sulfur 466, and calcium 468.

Next, at block 470, the position of the presentation system and/or plants is determined. This can be done using a suitable position detection system, such as position detection system 406 (shown in FIG. 7). Next, at block 472, the measured nutrient level 474 and position 476 are stored. Preferably, the time/date 478 of measurement is also stored. Such storage may be in local data store, in a remote data store, or both. This stored data can subsequently be used to inform agricultural decisions, such as the application of nutrients to the live crops as well as the manner in which such nutrients should be applied (e.g. side dress vs top dress).

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 10:
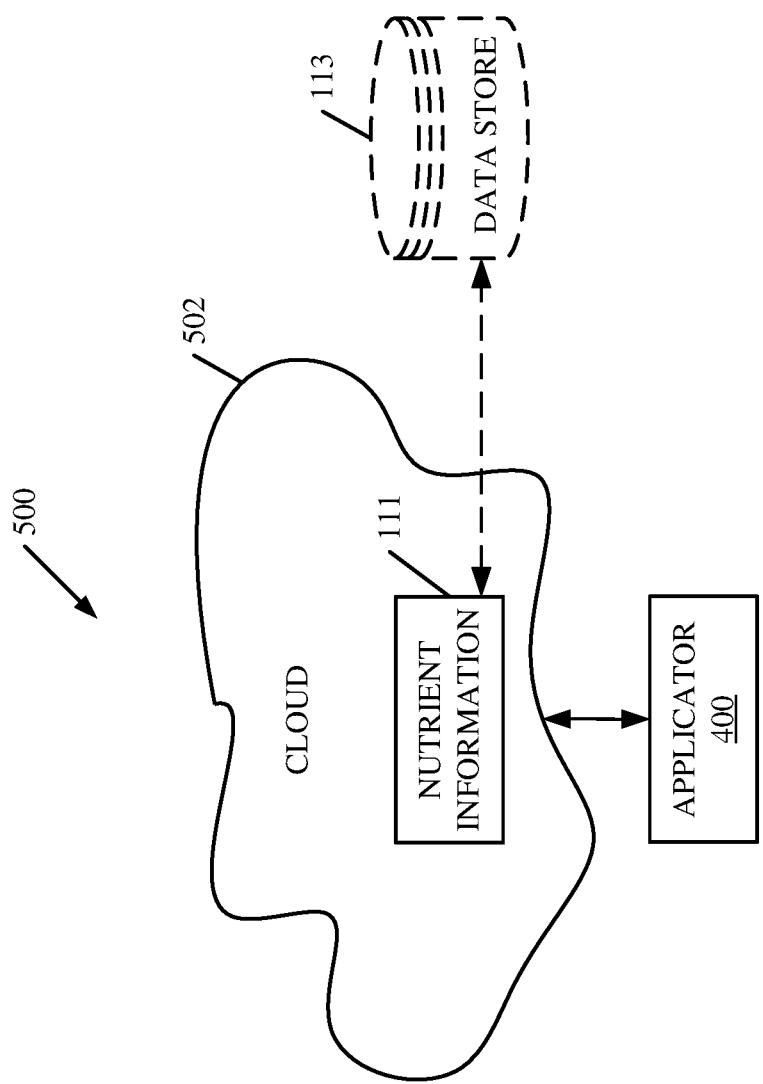
FIG. 10 is a block diagram of agricultural nutrient applicator, shown in FIG. 1, except that it communicates with elements in a remote server architecture.

FIG. 10 is a block diagram of agricultural nutrient applicator 100, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

FIG. 10 depicts another embodiment employing a remote server architecture. FIG. 10 shows that it is also contemplated that some elements of FIG. 7 are disposed at remote server location 502 while others are not. By way of example, nutrient information data store 111 can be located at location 502, illustrated diagrammatically in the cloud. It is expressly contemplated that cloud-based nutrient information data store 111 can be located in a single location, or split or otherwise dispersed among multiple physical locations Regardless of where they are located, they can be accessed directly by applicator control system 400, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck or fertilizer tender vehicle) can have an automated information collection system. As the applicator comes close to the fuel truck for fueling, the system automatically collects the information from the applicator using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the applicator until the applicator enters a covered location.

Figure 11:
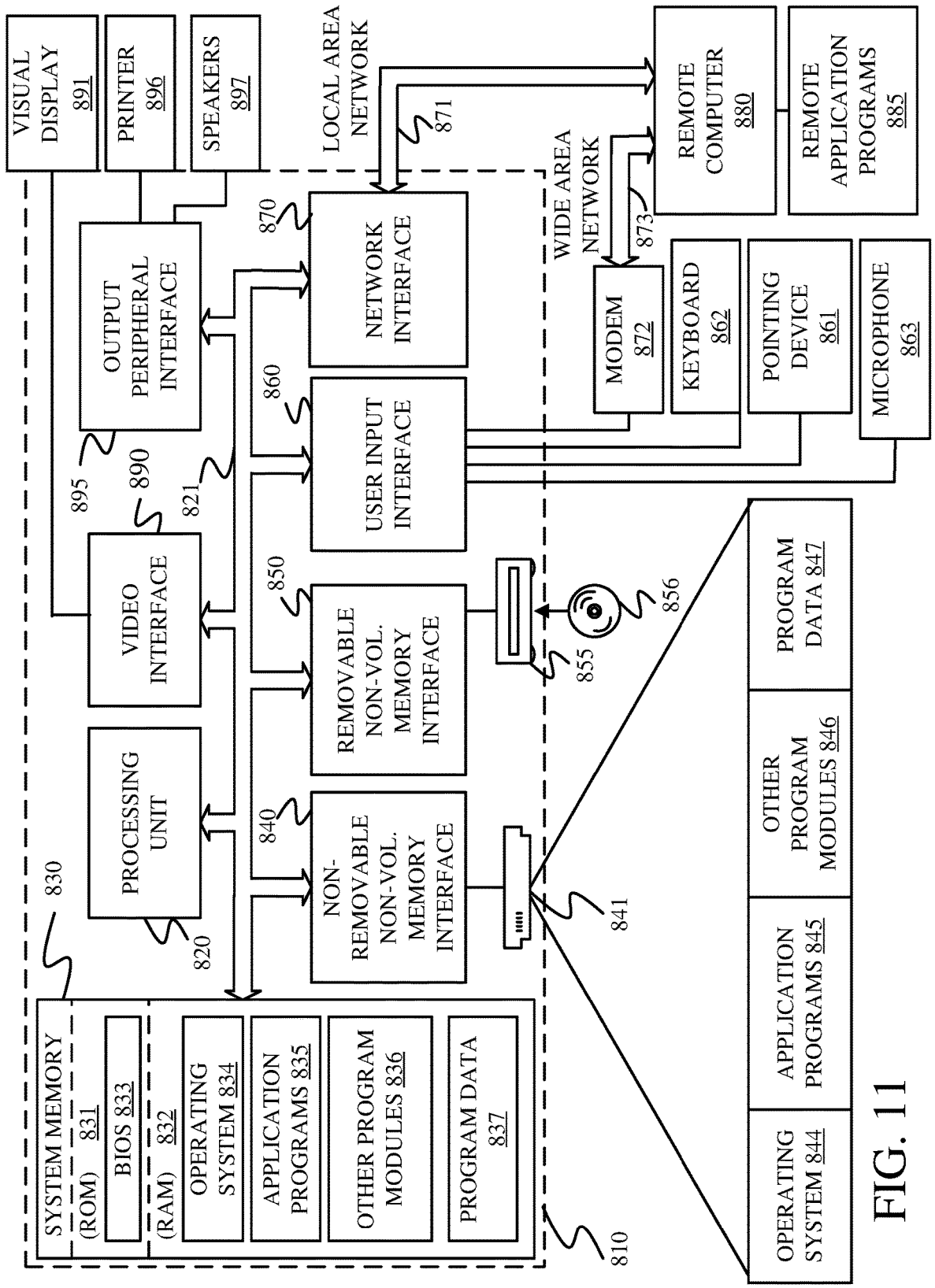
FIG. 11 is one embodiment of a computing environment in which elements of FIG. 7, or parts of it, (for example) can be deployed.

FIG. 11 is one embodiment of a computing environment in which elements of FIG. 7, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 7 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an agricultural nutrient applicator that includes a container and a nutrient distribution assembly operably coupled to the container to deliver a nutrient from the container. A spectroscopic reflectance (NIR) crop sense system is provided that includes an optical window. A presentation assembly is mounted to the agricultural nutrient applicator and is configured to position live plants in a field proximate the optical window of the spectroscopic reflectance crop sense system as the agricultural nutrient applicator moves. A controller is coupled to the spectroscopic reflectance crop sense system and the nutrient distribution assembly. The controller is configured to obtain, from the spectroscopic reflectance crop sense system, information indicative of a measured nutrient level in the live plants and determine a remedial nutrient amount based on the measured nutrient level and a target nutrient level. The controller controls the nutrient distribution assembly based on the remedial amount.

Example 2 is the agricultural nutrient applicator of any or all previous examples wherein the spectroscopic reflectance crop sense system is configured to generate illumination having a wavelength between 800 nanometers and 2,500 nanometers, the generated illumination passing through the optical window and reflecting off the live plants to provide an NIR response indicative of the measured nutrient level.

Example 3 is the agricultural nutrient applicator of any or all previous examples wherein the spectroscopic reflectance crop sense system is configured to generate illumination having a wavelength between 2500 nanometers and 8,000 nanometers, the generated illumination passing through the optical window and reflecting off the live plants to provide a response indicative of the measured nutrient level.

Example 4 is the agricultural nutrient applicator of any or all previous examples wherein the presentation assembly comprises a bottom surface configured to slide over the live plants, the bottom surface having an aperture disposed adjacent the optical window.

Example 5 is the agricultural nutrient applicator of any or all previous examples wherein the presentation assembly includes a tapered leading edge.

Example 6 is the agricultural nutrient applicator of any or all previous examples wherein the presentation assembly includes a surface contour configured to move the live plants toward the aperture.

Example 7 is the agricultural nutrient applicator of any or all previous examples wherein the presentation assembly includes an opaque curtain to block ambient light.

Example 8 is the agricultural nutrient applicator of any or all previous examples wherein an automatic height control system controls height of the presentation assembly to provide a suitable reflectance signal without damaging the live plants.

Example 9 is the agricultural nutrient applicator of any or all previous examples wherein the presentation assembly includes a plurality on pontoon-like structures arranged in parallel, and wherein the spectroscopic reflectance crop sense system is disposed between the plurality of pontoon-like structures.

Example 10 is the agricultural nutrient applicator of any or all previous examples wherein the spectroscopic reflectance crop sense system is disposed to view lower portions of the live plants.

Example 11 is the agricultural nutrient applicator of any or all previous examples wherein the presentation assembly includes a conveyor configured to move the live plants by the optical window of the spectroscopic reflectance crop sense system.

Example 12 is the agricultural nutrient applicator of any or all previous examples wherein the conveyor is configured to selectably bias the live plants against the optical window.

Example 13 is the agricultural nutrient applicator of any or all previous examples wherein the presentation assembly includes a plurality of stalk lifters.

Example 14 is the agricultural nutrient applicator of any or all previous examples wherein the presentation assembly is selectably deployable beneath the agricultural nutrient applicator.

Example 15 is the agricultural nutrient applicator of any or all previous examples and further comprising a second spectroscopic reflectance crop sense system.

Example 16 is the agricultural nutrient applicator of any or all previous examples and further comprising an additional sensor operably coupled to the controller, the controller being adapted to use a signal from the additional sensor to modify the remedial amount based on the additional sensor signal.

Example 17 is a method of providing a nutrient to agricultural plants in a field. The method includes: directing infrared illumination at the plants while they are in the field and obtaining a reflectance response signal; determining, based on the reflectance response signal, a measured nutrient level in the plants; comparing the measured nutrient level to a target level to determine a remedial nutrient level; and applying the remedial nutrient level to the plants.

Example 18 is the method of providing a nutrient to agricultural plants of any or all previous examples wherein directing infrared illumination at the plants is performed using a presentation assembly of an agricultural nutrient applicator moving relative to the plants.

Example 19 is the method of providing a nutrient to agricultural plants of any or all previous examples wherein the nutrient is selected from the group consisting of moisture content, nitrogen, potassium, protein, phosphorous, sulfur, and calcium.

Example 20 is the method of providing a nutrient to agricultural plants of any or all previous examples and further comprising obtaining additional sensor information to adjust the remedial nutrient level.

Example 21 is the method of providing a nutrient to agricultural plants of any or all previous examples wherein the additional sensor information is indicative of a condition of the plants across a width of an agricultural nutrient applicator, wherein an infrared crop sense system is disposed below a chassis of the agricultural nutrient applicator, and wherein a controller of the agricultural nutrient applicator is configured to correlate the additional sensor information at a position the infrared crop sense system with the reflectance response signal to extrapolate adjusted remedial amounts for other positions across the width of the agricultural nutrient applicator.

Example 22 is a method of measuring a nutrient of agricultural plants in a field. The method includes directing infrared illumination at the plants while they are in the field and obtaining a reflectance response signal; determining, based on the reflectance response signal, a measured nutrient level in the plants; determining a position of the plants; and storing the measured nutrient level and position in a data store.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural nutrient applicator comprising:
   a container;
   a nutrient distribution assembly operably coupled to the container to deliver a nutrient from the container;
   a spectroscopic reflectance crop sense system, the spectroscopic reflectance crop sense system having an optical window;
   a presentation assembly having a tapered leading edge and being mounted to the agricultural nutrient applicator, the presentation assembly being configured to position live plants in a field in contact with the optical window of the spectroscopic reflectance crop sense system as the agricultural nutrient applicator moves; and
   a controller coupled to the spectroscopic reflectance crop sense system and the nutrient distribution assembly, the controller being configured to obtain, from the spectroscopic reflectance crop sense system, information indicative of a measured nutrient level in the live plants and determine a remedial nutrient amount based on the measured nutrient level and a target nutrient level, the controller being further configured to control the nutrient distribution assembly based on the remedial amount.

2. The agricultural nutrient applicator of claim 1, wherein the spectroscopic reflectance crop sense system is configured to generate illumination having a wavelength between 800 nanometers and 2,500 nanometers, the generated illumination passing through the optical window and reflecting off the live plants to provide a response indicative of the measured nutrient level.

3. The agricultural nutrient applicator of claim 1, wherein the spectroscopic reflectance crop sense system is configured to generate illumination having a wavelength between 2500 nanometers and 8,000 nanometers, the generated illumination passing through the optical window and reflecting off the live plants to provide a response indicative of the measured nutrient level.

4. The agricultural nutrient applicator of claim 1, wherein the presentation assembly comprises a bottom surface configured to slide over the live plants, the bottom surface having an aperture disposed adjacent the optical window.

5. The agricultural nutrient applicator of claim 4, wherein the presentation assembly includes a surface contour configured to move the live plants toward the aperture.

6. The agricultural nutrient applicator of claim 4, wherein the presentation assembly includes an opaque curtain to block ambient light.

7. The agricultural nutrient applicator of claim 4, wherein an automatic height control system controls height of the presentation assembly to provide a suitable reflectance signal without damaging the live plants.

8. The agricultural nutrient applicator of claim 1, wherein the presentation assembly includes a plurality of pontoon-like structures arranged in parallel, and wherein the spectroscopic reflectance crop sense system is disposed between the plurality of pontoon-like structures.

9. The agricultural nutrient applicator of claim 8, wherein the spectroscopic reflectance crop sense system is disposed to view lower portions of the live plants.

10. The agricultural nutrient applicator of claim 1, wherein the presentation assembly includes a conveyor configured to move the live plants by the optical window of the spectroscopic reflectance crop sense system.

11. The agricultural nutrient applicator of claim 10, wherein the conveyor is configured to selectably bias the live plants against the optical window.

12. The agricultural nutrient applicator of claim 10, wherein the presentation assembly includes a plurality of stalk lifters.

13. The agricultural nutrient applicator of claim 1, wherein the presentation assembly is selectably deployable beneath the agricultural nutrient applicator.

14. The agricultural nutrient applicator of claim 1, and further comprising a second spectroscopic reflectance crop sense system.

15. The agricultural nutrient applicator of claim 1, and further comprising an additional sensor operably coupled to the controller, the controller being adapted to use a signal from the additional sensor to modify the remedial amount based on the additional sensor signal.

16. An agricultural nutrient applicator comprising:
a container;
a nutrient distribution assembly operably coupled to the container to deliver a nutrient from the container;
a spectroscopic reflectance crop sense system, the spectroscopic reflectance crop sense system having an optical window;
a presentation assembly mounted to the agricultural nutrient applicator, the presentation assembly being configured to position live plants in a field in contact with the optical window of the spectroscopic reflectance crop sense system as the agricultural nutrient applicator moves;
an automatic height control system configured to control height of the presentation assembly; and
a controller coupled to the spectroscopic reflectance crop sense system and the nutrient distribution assembly, the controller being configured to obtain, from the spectroscopic reflectance crop sense system, information indicative of a measured nutrient level in the live plants and determine a remedial nutrient amount based on the measured nutrient level and a target nutrient level, the controller being further configured to control the nutrient distribution assembly based on the remedial amount.

17. The agricultural nutrient applicator of claim 16, wherein the presentation assembly is configured to provide a selectable bias to the presentation assembly.

18. The agricultural nutrient applicator of claim 17, wherein the selectable bias is configured to achieve a sufficient signal from the spectroscopic reflectance crop sense system.

19. The agricultural nutrient applicator of claim 18, wherein the selectable bias is set such that the live plants are not damaged.

20. The agricultural nutrient applicator of claim 16, and further comprising an opaque curtain that blocks ambient light from the spectroscopic crop reflectance system.

21. The agricultural nutrient applicator of claim 16, wherein the automatic height control system is configured to position the presentation assembly to view a lower portion of the live plants.

* * * * *